United States Patent
Quintana et al.

(10) Patent No.: US 7,230,740 B2
(45) Date of Patent: Jun. 12, 2007

(54) SUBSTANTIAL PRECLUSION OF OUTPUT OF PIXELS FOR OTHER COLOR COMPONENTS UPON OUTPUT OF PIXEL FOR IMAGE PIXEL COLOR COMPONENT

(75) Inventors: Jason Quintana, Brush Prairie, WA (US); Morgan Schramm, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 999 days.

(21) Appl. No.: 10/304,319

(22) Filed: Nov. 25, 2002

(65) Prior Publication Data

US 2004/0100645 A1 May 27, 2004

(51) Int. Cl.
*H04N 1/52* (2006.01)

(52) U.S. Cl. .................................. 358/3.05; 358/534

(58) Field of Classification Search ............... 358/1.9, 358/3.03–3.06, 3.26, 534–536; 382/162, 382/252
See application file for complete search history.

(56) References Cited

U.S. PATENT DOCUMENTS

| | | | | |
|---|---|---|---|---|
| 5,535,019 A | | 7/1996 | Eschbach | 358/3.03 |
| 5,699,167 A | * | 12/1997 | Nozaki et al. | 358/1.9 |
| 5,739,917 A | | 4/1998 | Shu et al. | 358/2.1 |
| 5,767,886 A | * | 6/1998 | Kawakami et al. | 347/115 |
| 5,949,965 A | | 9/1999 | Gondek | 358/1.9 |
| 6,169,608 B1 | * | 1/2001 | Yoshida | 358/1.9 |
| 6,867,884 B1 | * | 3/2005 | Rozzi | 358/1.9 |
| 2002/0181025 A1 | * | 12/2002 | Yamaguchi | 358/3.28 |
| 2005/0134880 A1 | * | 6/2005 | Kang et al. | 358/1.9 |
| 2005/0168478 A1 | * | 8/2005 | Meroth | 345/589 |

FOREIGN PATENT DOCUMENTS

| | | |
|---|---|---|
| EP | 0732843 A2 | 9/1996 |
| WO | WO02/05545 A1 | 1/2002 |

* cited by examiner

*Primary Examiner*—Scott A. Rogers

(57) ABSTRACT

A method of one embodiment of the invention is disclosed that determines to output an output pixel for a color component of an image pixel. In response to determining to output the output pixel for the color component of the image pixel, the method outputs this output pixel, and at least substantially precludes output of output pixels for other color components of the image pixel.

43 Claims, 4 Drawing Sheets

SUBSTANTIAL PRECLUSION OF OUTPUT OF PIXELS FOR OTHER COLOR COMPONENTS UPON OUTPUT OF PIXEL FOR IMAGE PIXEL COLOR COMPONENT

BACKGROUND

Images may be represented as two-dimensional matrices of picture elements, or pixels. The spatial resolution and intensity level of each pixel are chosen to correspond to the type of output device being used. For example, computer monitors may display images at 75 dots per inch (DPI), and have 256 levels of intensity for each color component. Such monitors usually use the additive primary color components, red, green, and blue (RGB), which can be combined to produce millions of colors, as well as black. Pixels having more than two levels of intensity for each color component are referred to herein as image pixels.

However, image-forming devices that output onto media, such as inkjet printers and laser printers, may be binary devices. In binary device, for each pixel location on the printed medium, the device can only print at two levels for each color component, on or off. The pixels output by such image-forming devices are referred to herein as output pixels. In binary devices, image pixels, having more than two levels of intensity for each color component, are therefore converted to output pixels, having only two levels of intensity for each color component, prior to their output by image-forming devices onto media. Such conversion is commonly referred to as halftoning.

One halftoning approach is known as error diffusion. In error diffusion, for each color of an image pixel, the decision to output a corresponding output pixel by the image-forming device is based on the intensity level of the color component of the image pixel, as well as the output pixels output for the previous image pixels. Error diffusion tries to distribute output pixels so as to reduce pixel overlap, reduce empty space between output pixels, and otherwise create eye-pleasing patterns. However, at least some such approaches, such as plane-dependent halftoning, are usually successful only for colors of similar darkness, leading lead to unpleasant patterns for colors of varying darkness.

SUMMARY OF THE INVENTION

A method of one embodiment of the invention determines to output an output pixel for a color component of an image pixel. In response to determining to output the output pixel for the color component of the image pixel, the method outputs this output pixel, and at least substantially precludes output of output pixels for other color components of the image pixel.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
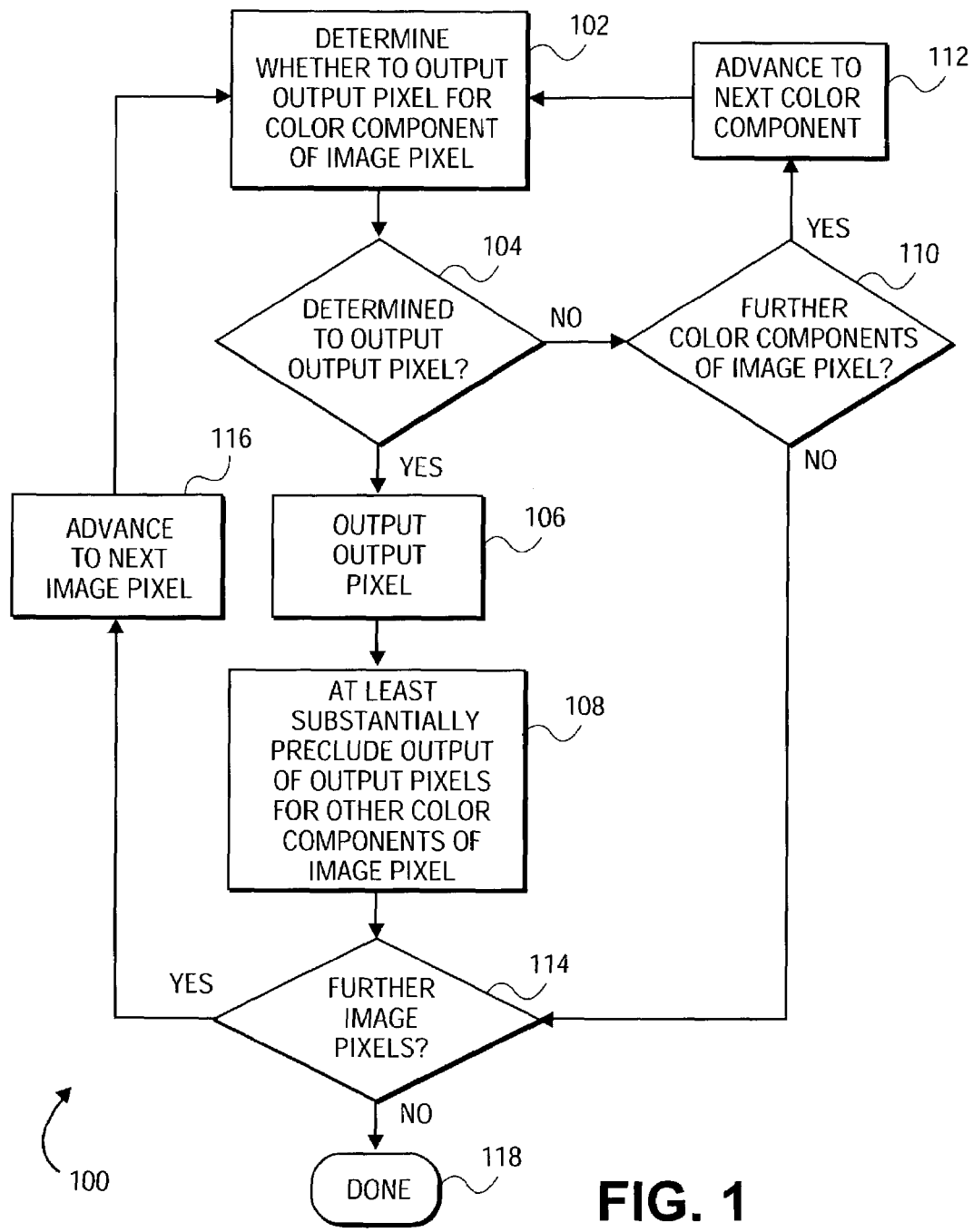
FIG. 1 is a flowchart of a method according to an embodiment of the invention.

FIG. 1 shows a method 100 according to an embodiment of the invention. Like the other methods of other embodiments of the invention, the method 100 can be implemented by computer-executable instructions, such as those of one or more computer programs, stored on a computer-readable medium. The computer-readable medium may be volatile or non-volatile memory, a magnetic, optical, and/or solid state memory, and so on. The method 100 is preferably performed in accordance with a halftoning approach, such as an error diffusion technique.

The method 100 determines whether an output pixel for a color component of an image pixel should be output (102). The manner by which the method 100 determines whether to output an output pixel for a color component of the image pixel is not limited by embodiments of the invention, and a specific approach for such determination is described in a later section of the detailed description. The image pixel is preferably one of a number of image pixels of image data. The image data has or already has been converted to the same color space as that of the output device, such as an image-forming device like a laser or an inkjet printer, which outputs the output pixels. For instance, the color space may be the cyan-magenta-yellow-black (CMYK) color space, as may be utilized in color inkjet printers. The method 100 also preferably starts at a first pixel of the image data, and at a darkest color component of the image pixel.

For each image pixel of the image data, there is an intensity value for each color component of the color space of the image data. For example, a given image pixel may have intensity values between 0 and 255 for each of the cyan, magenta, yellow, and black color components. An output pixel may be output for each color component of the image pixel. An output pixel is binary, having on and off states. That an output pixel has been output means that the on state of the output pixel has been output, such as corresponding to the ejection of ink or other fluid by the image-forming device, or such as the exposure of a region on a photoconductor corresponding to the output pixel by a laser in the image-forming device. That an output pixel has not been output means that the output pixel has the off state, such as corresponding to no ink or other fluid being ejected by the image-forming device, or no exposure of the region on the photoconductor corresponding to the output pixel.

If the method 100 has determined to output the output pixel (104), then the output pixel for the color component of the image pixel is output (106). For example, ink or other fluid may be ejected by the image-forming device where the device is an inkjet printer or other fluid-ejection device. This is known as firing the output pixel, since the inkjet pen corresponding to the color component of the image pixel is fired to output the output pixel. As another example, the location corresponding to the output pixel on the photoconductor of a laser printer may be turned on or off such that toner is later applied to media at this location. That is, a region corresponding to the output pixel is set on the photoconductor or other laser-printing mechanism.

Next, the method 100 at least substantially precludes output of output pixels for the other color components of the image pixel (108). This means that no output pixel, for no other color component of the image pixel, will likely be output for the image pixel. That is, the output pixel that has already been output will likely be the only output pixel output at the location on the media corresponding to the image pixel. This is the case even where the other color components of the image pixel have relatively large non-zero intensity values. The at least substantial preclusion of such output substantially prevents output pixels from overlapping one another. A specific exception to the preclusion of output of output pixels for the other color components of the image pixel, rendering the preclusion at least substantial preclusion, is described in a later section of the detailed description.

If there are further image pixels in the image data (114), then the method 100 advances to the next image pixel (116), and repeats 102, 104, and so on. If there are no further image pixels in the image data (114), then the method 100 is finished (118). However, if the method 100 has determined to not output an output pixel for the color component in 102 (104), and there are further color components of the image pixel (110), then the method 100 proceeds to advance to the next color component (112), and repeats 102, 104, and so on. For example, where the method 100 starts with the darkest color component, it then advances to the next-darkest color component, and so on, until the lightest color component is reached. In the context of the CMYK color space, this ordering is black, cyan, magenta, and yellow, or black, magenta, cyan, and yellow, from darkest to lightest. If there are no further color components of the image pixel (110), however, then the method proceeds to 114, as has been described.

In one embodiment of the invention, the determination in 102 as to whether to output an output pixel for a color component of an image pixel is performed in correlation with determining whether to output output pixels for one or more other color components of the image pixel. For example, one such approach is known as plane-dependent halftoning, because the decision as to whether an output pixel for one color component, or plane, is output is made in conjunction with the decision as to whether an output pixel for another, adjacent color component, or plane, is output. The two color components that are commonly correlated in this respect are cyan and magenta.

Figure 2:
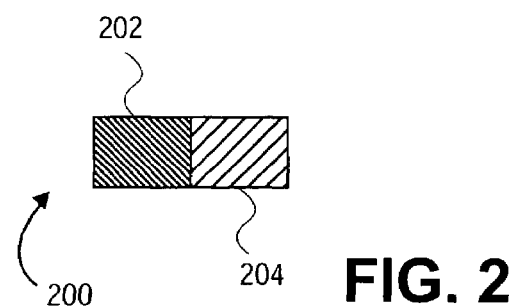
FIG. 2 is a diagram of a representative scenario depicting performance of the method of FIG. 1, according to an embodiment of the invention.

FIG. 2 shows a simple representative scenario 200 of the performance of the method 100 of FIG. 1, according to an embodiment of the invention. There are two locations at which an output pixel can be output, the pixel location 202 and the pixel location 204, each corresponding to an image pixel of image data having the CMYK color space. As can be appreciated by those of ordinary skill within the art, there is likely to be a larger number of pixel locations than the two depicted in FIG. 2. For instance, image data may include hundreds, thousands, millions, or more image pixels, corresponding to a like number of pixel locations.

The pixel location 202 is blacked out, indicating that an output pixel for the black color component of a first image pixel has been output. This means that other output pixels for the other, lighter color components of the first image pixel are at least substantially precluded from being output at the pixel location 202. That is, output pixels for the cyan, magenta, and yellow color components of the first image pixel will likely not be output at the pixel location 202.

Conversely, the pixel location 204 is shaded, indicating that an output pixel for the magenta color component of a second pixel has been output. This means that the method 100 first determined that neither a black output pixel, nor a cyan output pixel, were to have been output at the pixel location 204. That is, because black and cyan are darker color components than magenta, the method 100 would have first performed 102 relative to them for the image pixel corresponding to the pixel location 204, before performing 102 relative to the magenta color component for the image pixel. Furthermore, the output pixel for the only color component lighter than magenta of the second image pixel—yellow—is at least substantially precluded from being output at the pixel location 204.

PARTICULAR EMBODIMENT OF METHOD

Figure 3:
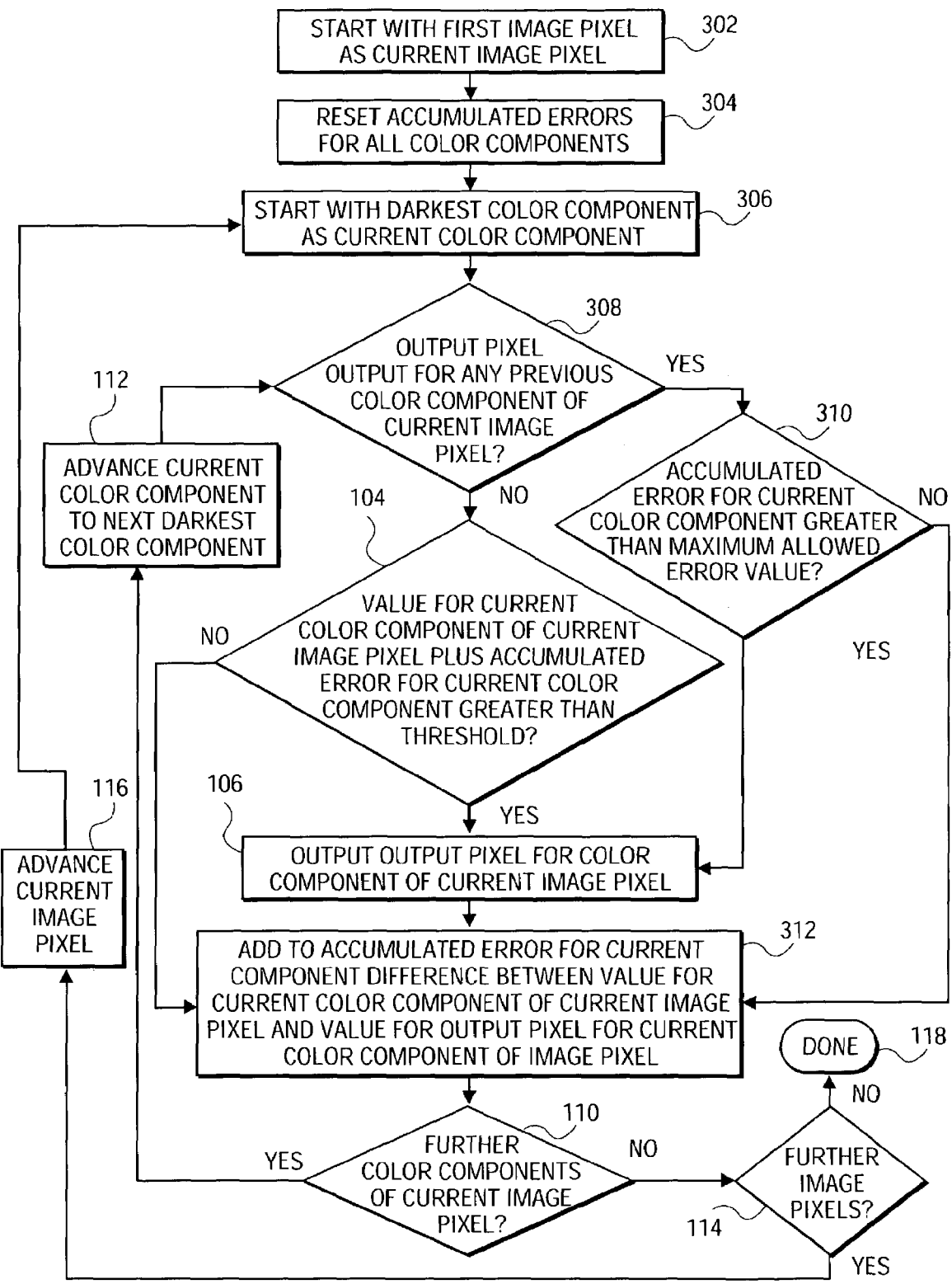
FIG. 3 is a flowchart of a method more detailed than but consistent with the method of FIG. 1, according to an embodiment of the invention.

FIG. 3 shows a more detailed embodiment of the method 100, which is consistent with the method 100 of the embodiment of FIG. 1. Like-numbered parts of the method 100 in the embodiments of FIGS. 1 and 3 achieve the same functionality in both the embodiments of FIGS. 1 and 3. However, the manner by which such functionality is described as being achieved in the embodiment of FIG. 3 does not limit the general functionality of such like-numbered parts that has already been described relative to the embodiment of FIG. 1.

The method 100 of the embodiment of FIG. 3 is described in relation to image data having a cyan-magenta-yellow-black (CMYK) color space. Each image pixel of the image data has an intensity value for each color component of the color space. The method 100 of the embodiment of FIG. 3 is further described in relation to there being 256 possible intensity values, from zero through 255, for each color component of each image pixel of the image data. That is, the CMYK color space is an eight-bit color space, since $2^8$ equals 256.

The method 100 starts with the first image pixel, such as the upper left-hand corner pixel, of the image data as the current image pixel (302). The method 100 initially resets the accumulated errors for all the color components (304). There is an accumulated error for each color component. The accumulated error for a color component is the running total of the differences between the intensity values for the color component of the image pixels and the values for the output pixels for the color component of the image pixels. Because the output pixels are binary, it is said that the lower value that an output pixel can have is zero, and the upper value that an output pixel can have is 255, or two to the power of the size of the color space, minus one. So, for example, if the intensity value for the cyan color component of a given image pixel is 186, and an output pixel was output for the cyan color component of this pixel, such that the output pixel has a value of 255, the difference (186–255) would be added to the accumulated error.

The method 100 further starts with the darkest color component as the current color component (306). The darkest color component of the CMYK color space is black, followed by cyan, magenta, and yellow, from darkest to lightest. If no output pixel has been output for any previous color component of the current image pixel (308), as is the case for the darkest color component of the current image pixel, then the method 100 proceeds to 104. The method 100 in 104 determines whether an output pixel should be output for the current color component of the current image pixel. More specifically, the method 100 determines whether the value for the current color component of the current image pixel plus the accumulated error for the current color component is greater than a threshold, such as 128, or half the value of two to the power of the size of the color space.

If the method 100 determines that an output pixel should be output for the current color component of the current image pixel (104), then the output pixel for the current color component of the current image pixel is output (106). That is, where the method 100 determines that no output pixel has been output for any previous color component of the current image pixel (308), and that the an output pixel should be output for the current color component of the current image pixel (104), then the output pixel for the current color component of the current image pixel is output (106). The output pixel being output may be the firing of the output pixel, and so on, as has been described.

The difference between the intensity value for the current color component of the current image pixel and the value for the output pixel for the current color component of the current image pixel is added to the accumulated error for the current color component (312). Such updating of the accumulated error for the current color component occurs regardless of whether the method 100 proceeded from 104 to 106 to 312, such that the output pixel was actually output, or directly from 104 to 312, such that no output pixel was actually output. As has been described, it is said that the value of the output pixel when the output pixel was actually output is 255, whereas the value of the output pixel when no output pixel was actually output is zero. This is because the output pixel is binary, having a maximum value, or 255, when the output pixel is output, and having a minimum value, or zero, when it is not output.

However, referring back to 308, if an output pixel has been output for any previous color component of the current image pixel, then the method 100 proceeds to 310 instead of to 104. The method 100 in 310 determines whether the accumulated error for the current color component is greater than a maximum allowed error value, which can be defined in a number of different manners. In one embodiment, the maximum allowed error value is the maximum allowed intensity of a color component of an image pixel, or two to the power of the size of the color space. In another embodiment, the maximum allowed error value is two times the threshold that is utilized in 104 of the method 100 of the embodiment of FIG. 3. Thus, the maximum allowed error value can be, for instance, 256.

If the method 100 determines that the accumulated error for the current color component is greater than the maximum allowed error value (310), then the output pixel for the current color component of the current image pixel is output (106). That is, where the method 100 determines that an output pixel has been output for any previous color component of the current image pixel (308), and that the accumulated error for the current color component is greater than the maximum allowed error value (310), then the output pixel for the current color component of the current image pixel is nevertheless output (106). The accumulated error for the current color component being greater than the maximum allowed error value is the exception to the preclusion of outputting an output pixel for any other color component of the image pixel once an output pixel has already been output for one of the color components of the image pixel. This exception therefore renders such preclusion as at least substantial preclusion.

After an output pixel has been output for the current color component of the current image pixel (106), either resulting from the method 100 proceeding from 104 or 310 to 106, then the accumulated error for the current color component is updated (312), as has been described. The accumulated error is also updated where no output pixel has been output for the current color component of the current image pixel, either resulting from the method 100 proceeding from 104 to 312, or from 310 to 312. The method 100 next determines whether there are any further color components of the current image pixel (110).

If there are, the current color component is advanced to the next darkest color component (112), such as from black to cyan, from cyan to magenta, or from magenta to yellow. The method 100 then repeats 308 as has been described. If there are not any further color components of the current image pixel (110), then the method 100 determines whether there are any further image pixels of the image data (114). If there are, then the method 100 advances the current image pixel to the next image pixel (116), and repeats 306 as has been described. If there are not, then the method 100 is finished (118).

Figure 4:
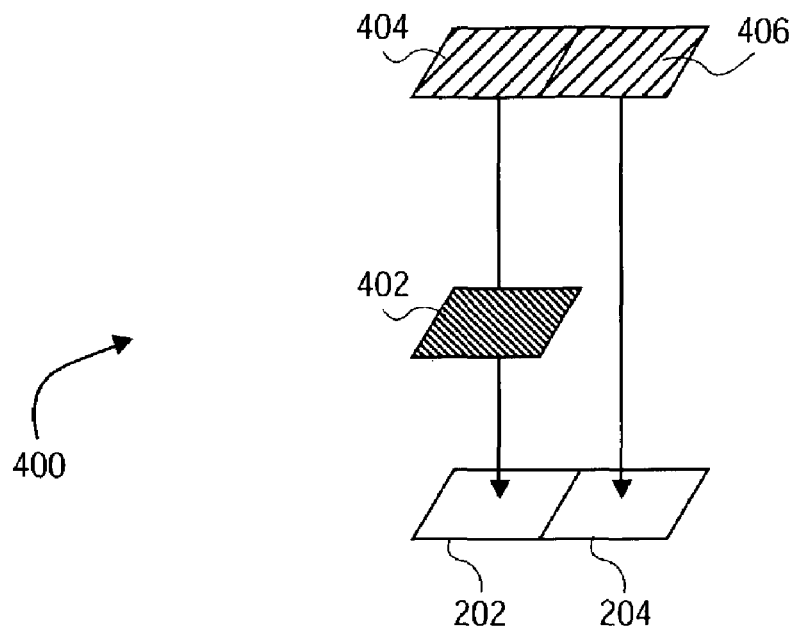
FIG. 4 is a diagram of a representative scenario depicting performance of the method of FIG. 3, according to an embodiment of the invention.

FIG. 4 shows a simple representative scenario 400 of the performance of the method 100 of FIG. 3, according to an embodiment of the invention. There are two locations at which an output pixel can be output, the pixel location 202 and the pixel location 204, each corresponding to an image pixel of image data having the CMYK color space. There is likely to be a larger number of pixel locations than the two depicted in FIG. 2, however, as can be appreciated by those of ordinary skill within the art.

The pixel location 202 first has had a black output pixel 402 output thereon for the black color component of a first image pixel. The output of the black output pixel 402 at least substantially precludes output of an output pixel for any other color component of the first image pixel. However, the pixel location 202 also has the magenta output pixel 404 output thereon for the magenta color component of the first image pixel. This means that the accumulated error for the magenta color component was greater than the allowed maximum error value, such that the magenta output pixel 404 nevertheless was output on the pixel location 202 corresponding to the first image pixel.

Conversely, the pixel location 204 only has a magenta output pixel 406 output thereon for the magenta color component of a second image pixel. This means that the method 100 of FIG. 3 first determined that neither a black output pixel, nor a cyan output pixel, were to have been output at the pixel location 204, since black and cyan are darker color components than magenta. Furthermore, the output pixel for the yellow color component of the second image pixel, which is the only color component that magenta is darker than, is at least substantially precluded from being output at the pixel location 204.

Image-Forming and Computing Devices

Figure 5:
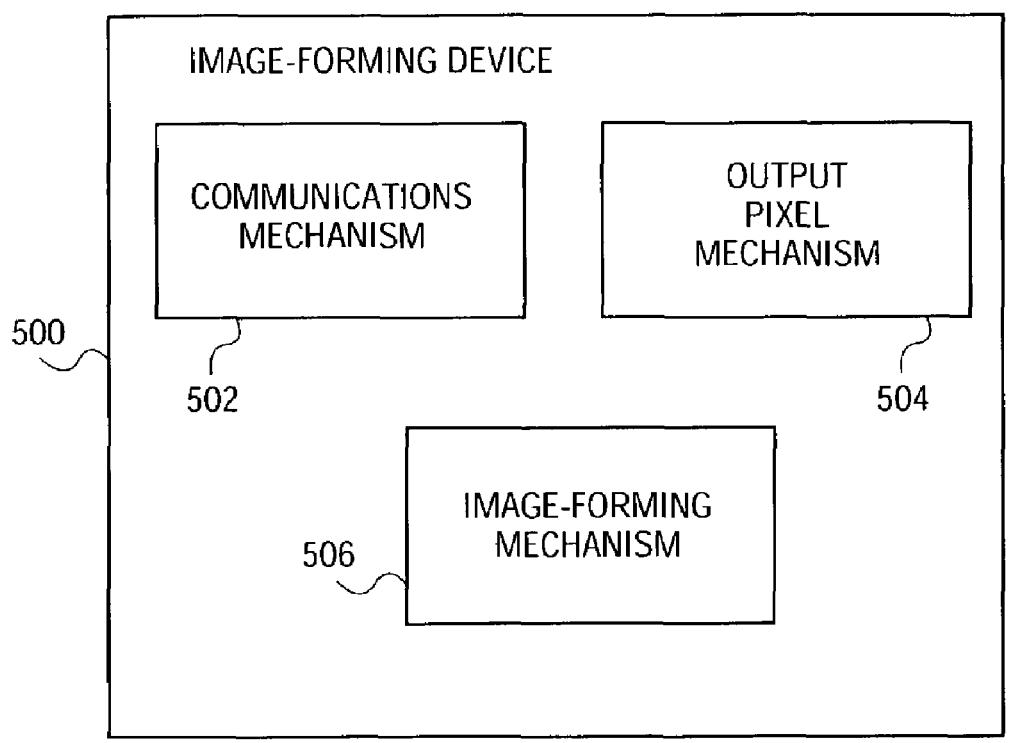
FIG. 5 is a block diagram of an image-forming device, according to an embodiment of the invention.
Figure 6:
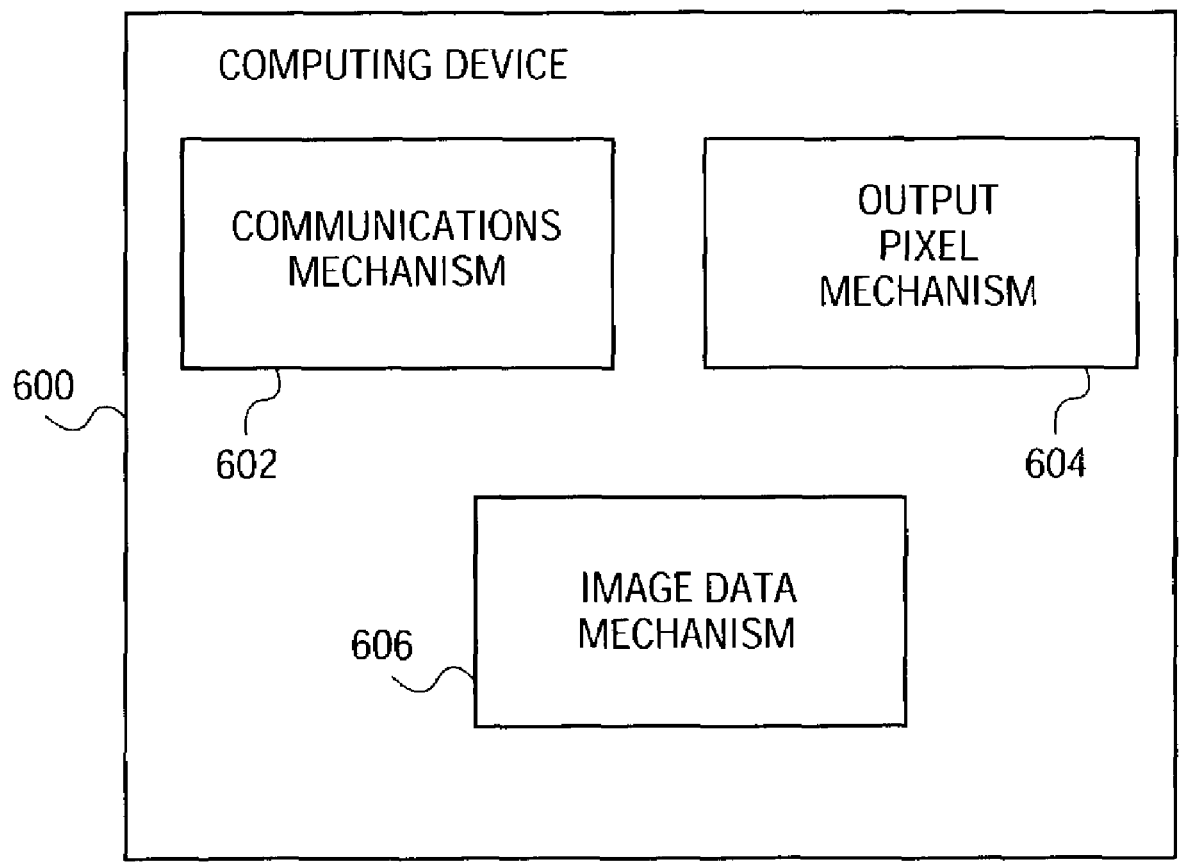
FIG. 6 is a block diagram of a computing device, according to an embodiment of the invention.

FIGS. 5 and 6 show block diagrams of different devices, according to varying embodiments of the invention, which can perform the method 100 of FIGS. 1 and 3. In FIG. 5, an image-forming device 500 is depicted, according to an embodiment of the invention. The image-forming device 500 may be an inkjet printer, a laser printer, or another type of image-forming device. The image-forming device 500 includes a communications mechanism 502, an output pixel mechanism 504, and an image-forming mechanism 506. As can be appreciated by those of ordinary skill within the art, the device 500 can include other mechanisms in addition to or in lieu of the mechanisms depicted in FIG. 5. The image-forming device 500 forms images on media, such as paper and other types of media.

The communications mechanism 502 receives image data that has a number of image pixels, from a communicatively coupled source device, such as a computing device like a computer, a digital camera, a personal digital assistant (PDA) device, or another type of computing device. The communications mechanism 502 may include wired and/or wireless communications adapters, such as serial ports, Universal Serial Bus (USB) ports, parallel ports, Ethernet adapters, 802.11b wireless network adapters, Bluetooth wireless adapters, and so on.

The output pixel mechanism 504 performs the method 100 of the embodiments of FIGS. 1 and/or 3 that have been described. That is, the output pixel mechanism 504 determines whether, for each color component of each image pixel, an output pixel should be output. The output pixel mechanism 504 may include computer-executable instructions organized as computer programs, subroutines, modules, objects, and so on.

The output pixel mechanism 504 outputs the output pixels by utilizing the image-forming mechanism 506, which actually forms images on media. In the case where the image-forming device 500 is an inkjet printer, the image-forming mechanism 506 may be an inkjet-printing mechanism. Similarly, in the case where the image-forming device 500 is a laser printer, the image-forming mechanism 506 may be a laser-printing mechanism. The image-forming mechanism 506 may be another type of image-forming mechanism as well.

FIG. 6 shows a computing device 600, according to an embodiment of the invention. The phrase computing device is used generally, such that the device may be a computer, like a desktop or a laptop computer, a personal digital assistant (PDA) device, a digital camera, or another type of computing device. The computing device 600 includes a communications mechanism 602, the output pixel mechanism 504, and an image data mechanism 606. As can be appreciated by those of ordinary skill within the art, the device 600 can include other mechanism in addition to or in lieu of the mechanisms depicted in FIG. 6.

The communications mechanism 602 is for communicating with an image-forming device, like the device 500 of FIG. 5, such that the device 600 is communicatively coupled with the device 500. The mechanism 602 may thus include wired and/or wireless communications adapters, as have been described. The communications mechanism 602 more specifically sends the output pixels for the color components of the image pixels to the image-forming device 500 for image formation corresponding thereto on media.

The output corresponding mechanism 504 thus performs the method 100 of the embodiments of FIGS. 1 and/or 3 that have been described. Once the output pixel mechanism 504 determines whether, for each color component of each image pixel, an output pixel should be output, such output pixels are sent by the communications mechanism 602 to the image-forming device. Thus, the output pixel mechanism 504 outputs the output pixels by utilizing the image-forming device to which the device 600 is communicatively coupled. The output pixel mechanism 504 can include computer-executable instructions organized as computer programs, subroutines, modules, objects and so on.

The image data mechanism 606 receives the image data that includes the image pixels for which the output pixel mechanism 504 determines whether output pixels should be output. The image data mechanism 606 may receive the image data from an internal or external source. For instance, the image data mechanism 606 may internally receive the image data from an application program running on the computing device 600, or externally from a peripheral device communicatively coupled to the computing device 600. Like the output pixel mechanism 504, the image data mechanism 606 may include computer-executable instructions organized as computer programs, subroutines, modules, objects, and so on, and, like the communications mechanism 602, the mechanism 606 may include wired and/or wireless communications adapters.

Multi-level Halftoning

Embodiments of the invention have been described thus far are particularly related to binary halftoning, in which an output pixel for a given color component of an image pixel is either on or off. That is, the output pixel may have one of two values. However, as can be appreciated by those of ordinary skill within the art, other embodiments of the invention can be utilized in conjunction with multi-level halftoning, in which an output pixel for a given color component of an image pixel may have one of a number of different values. For example, within an inkjet printer, a given output pixel may correspond to zero, one, or two drops of ink, such that there are three different values that the output pixel can have.

In one embodiment, to accomplish such multi-level halftoning, the color component of an image pixel is effectively divided into a number of levels. For instance, there may be three levels, eight-bit values between zero and X, eight-bit values greater than X and less than Y, and eight-bit values greater than or equal to Y. Whereas in the binary halftoning embodiment that has been described an output pixel has a value of 255, such that ink is actually output, above a given threshold, and has a value of zero, such that ink is not output, below a given threshold, in this multi-level halftoning embodiment, there are two thresholds. At or below X, no ink is output, and at or above Y there is maximum ink output, while between X and Y there is a lesser amount of ink output. For example, one drop of ink may be output for an output pixel having a value between X and Y, whereas two or more drops of ink may be output for an output pixel having a value at or above Y.

As can be appreciated by those of ordinary skill within the art, other multi-level halftoning approaches are also amenable to embodiments of the invention. For example, if the color component of an image pixel has a value of 127, this may be referred to as base level zero, such that there is a scaled so-called contone value of 253. If the value is 128, then this may be referred to as base level one, such that there is a scaled contone value of zero. Thus, if the value is 64, then this may be referred to as base level zero with a scaled contone value of 128. Therefore, there are break points at zero, 128, and 255, such that values under 128 receive base level zero and scaled contone values of $$255 \times \frac{\text{value}}{128},$$

and values above 128 receive base level one and scaled contone values of $$255 \times \frac{\text{value} - 128}{128}.$$

A lookup table may alternatively be used to obtain the base level and scaled contone value. The end result is then that binary halftoning can be used on the scaled contone value, and the result of the binary halftoning added to the base level.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
   in response to determining to output an output pixel for a color component of an image pixel,
   outputting the output pixel for the color component of the image pixel; and,
   at least substantially precluding output of output pixels for other color components of the image pixel, by outputting an output pixel for one of the other color components of the image pixel in response to determining that an accumulated error for the one of the other color components of the image pixel is greater than a maximum allowed error value.

2. The method of claim 1, further comprising, after at least substantially precluding output of the output pixels for the other color components of the image pixel, proceeding to a next image pixel.

3. The method of claim 1, further comprising in response to determining to not output an output pixel for the color component of the image pixel, repeating the method for each of the other color components of the image pixel.

4. The method of claim 3, wherein the color component is a darkest color component of the image pixel, and the method repeats for each of the other color components from a darkest of the other color components to a lightest of the other color components.

5. The method of claim 4, wherein for at least two of the other color components, the method repeats for the at least two of the other color components such that determining whether to output an output pixel for each of the at least two of the other color components is performed in correlation with determining whether to output output pixels for other of the at least two of the other color components.

6. The method of claim 4, wherein the color component is black, and the other color components are cyan, magenta, and yellow.

7. The method of claim 1, wherein the color component is a darkest color component of the image pixel.

8. The method of claim 7, wherein the color component is black.

9. The method of claim 1, wherein determining to output the output pixel for the color component of the image pixel comprises utilizing an error diffusion approach to determine whether to output the output pixel for the color component of the image pixel.

10. The method of claim 1, wherein determining to output the output pixel for the color component of the image pixel comprises utilizing a binary halftoning approach to determine whether to output the output pixel for the color component of the image pixel.

11. The method of claim 1, wherein determining to output the output pixel for the color component of the image pixel comprises utilizing a multi-level halftoning approach to determine whether to output the output pixel for the color component of the image pixel.

12. The method of claim 1, wherein determining to output the output pixel for the color component of the image pixel comprises determining whether a value for the color component of the image pixel plus an accumulated error for the color component is greater than a threshold.

13. The method of claim 12, further comprising adding to the accumulated error for the color component a difference between the value for the color component of the image pixel and a value for the output pixel for the color component of the image pixel.

14. The method of claim 1, wherein outputting the output pixel for the color component of the image pixel comprises ejecting ink in accordance with a binary halftoning approach.

15. The method of claim 1, wherein outputting the output pixel for the color component of the image pixel comprises ejecting one or more drops of ink, depending on a level of the output pixel for the color component, in accordance with a multi-level halftoning approach.

16. The method of claim 1, wherein outputting the output pixel for the color component of the image pixel comprises firing the output pixel for the color component of the image pixel.

17. The method of claim 1, wherein outputting the output pixel for the color component of the image pixel comprises ejecting fluid by a fluid-ejecting mechanism corresponding to the output pixel for the color component of the image pixel.

18. The method of claim 17, wherein ejecting the fluid corresponding to the output pixel for the color component of the image pixel comprises ejecting ink by an inkjet-printing mechanism corresponding to the output pixel for the color component of the image pixel.

19. The method of claim 1, wherein outputting the output pixel for the color component of the image pixel comprises setting a region corresponding to the output pixel for the color component of the image pixel.

20. The method of claim 19, wherein setting the output pixel for the color component of the image pixel comprises setting a region on a laser-printing mechanism corresponding to the output pixel for the color component of the image pixel.

21. A method comprising:
   for each color component of a plurality of color components of an image pixel, from darkest to lightest:

where an output pixel for any preceding color component of the plurality of color components of the image pixel has been output, in response to determining that an accumulated error for the color component is greater than a maximum allowed error value, outputting the output pixel for the color component of the image pixel; and, where no output pixel for any preceding color component of the plurality of color components of the image pixel has been output, in response to determining to output the output pixel for the color component of the image pixel, outputting the output pixel for the color component of the image pixel.

22. The method of claim 21, further comprising, repeating the method for each of a plurality of other image pixels.

23. The method of claim 21, wherein determining whether to output the output pixel for the color component of the image pixel comprises determining whether a value for the color component of the image pixel plus the accumulated error for the color component is greater than a threshold, and adding to the accumulated error for the color component a difference between the value for the color component of the image pixel and a value for the output pixel for the color component of the image pixel.

24. The method of claim 21, wherein for at least two adjacent color components of the plurality of color components of the image pixel, determining whether to output the output pixel for each of the at least two adjacent color components of the plurality of color components is correlated with determining whether to output the output pixel for each other of the at least two adjacent color components of the plurality of color components.

25. The method of claim 21, wherein the plurality of color components are, from darkest to lightest, black, cyan, magenta, and yellow.

26. The method of claim 25, wherein for the cyan and the magenta color components of the image pixel, determining whether to output the output pixel for each of the cyan and the magenta color components is correlated with determining whether to output the output pixel for each other of the cyan and the magenta color components.

27. The method of claim 21, wherein outputting the output pixel for the color component of the image pixel comprises ejecting fluid by a fluid-ejecting mechanism corresponding to the output pixel for the color component of the image pixel.

28. A computer-readable medium having computer-executable instructions stored thereon to perform a method comprising:

for each image pixel of a plurality of image pixels,
for each color component of a plurality of color components of the image pixel, from darkest to lightest,
where an output pixel for any preceding color component of the plurality of color components of the image pixel has been output, in response to determining that an accumulated error for the color component is greater than a maximum allowed error value, outputting the output pixel for the color component of the image pixel, and adding to the accumulated error for the color component a difference between the value for the color component of the image pixel and a value for the output pixel for the color component of the image pixel; and,
where no output pixel for any preceding color component of the plurality of color components of the image pixel has been output, in response to determining that the value for the color component of the image plus the accumulated error for the color component is greater than the threshold, outputting the output pixel for the color component of the image pixel, and adding to the accumulated error for the color component a difference between the value for the color component of the image pixel and a value for the output pixel for the color component of the image pixel.

29. The computer-readable medium of claim 28, wherein for at least two adjacent color components of the plurality of color components of the image pixel, determining whether to output the output pixel for each of the at least two adjacent color components of the plurality of color components is correlated with determining whether to output the output pixel for each other of the at least two adjacent color components of the plurality of color components.

30. The computer-readable medium of claim 28, wherein the plurality of color components are, from darkest to lightest, black, cyan, magenta, and yellow.

31. The computer-readable medium of claim 28, wherein for the cyan and the magenta color components of the image pixel, determining whether to output the output pixel for each of the cyan and the magenta color components is correlated with determining whether to output the output pixel for each other of the cyan and the magenta color components.

32. The computer-readable medium of claim 28, wherein outputting the output pixel for the color component of the image pixel comprises ejecting fluid by a fluid-ejecting mechanism corresponding to the output pixel for the color component of the image pixel.

33. A device comprising:

a first mechanism to receive image data including a plurality of image pixels; and, a second mechanism to, for a color component of a plurality of color components of each image pixel, output an output pixel for the color component of the image pixel, and to substantially preclude output of output pixels for other color components of the image pixel, by outputting an output pixel for one of the other color components of the image pixel in response to determining that an accumulated error for the one of the other color components is greater than a maximum allowed error value.

34. The device of claim 33, wherein the device is a computing device communicatively coupled to an image-forming device.

35. The device of claim 34, further comprising a third mechanism to send the output pixel for each color component of the plurality of color components of each image pixel of the plurality of image pixels to the image-forming device for image formation corresponding thereto on media.

36. The device of claim 34, wherein the first mechanism receives the image data internally from within the computing device.

37. The device of claim 33, wherein the device is an image-forming device communicatively coupled to a source device, for image formation corresponding to the plurality of image pixels on media.

38. The device of claim 37, wherein the first mechanism receives the image data from the source device.

39. The device of claim 37, wherein the image-forming device is one of an inkjet printer and a laser printer.

40. The device of claim 33, wherein the plurality of color components are black, cyan, magenta, and yellow.

41. A device comprising:
a mechanism to receive image data including a plurality of image pixels; and,
means for, for a color component of a plurality of color components of each image pixel, outputting an output pixel for the color component of the image pixel, and for substantially precluding output of output pixels for other color components of the image pixel, by outputting an output pixel for one of the other color components of the image pixel in response to determining that an accumulated error for the one of the other color components is greater than a maximum allowed error value.

42. The device of claim 41, wherein the device is one: of a computing device communicatively coupled to an image-forming device, and the image-forming device communicatively coupled to the computing device.

43. The device of claim 41, wherein the plurality of color components are black, cyan, magenta, and yellow.

* * * * *

UNITED STATES PATENT AND TRADEMARK OFFICE
CERTIFICATE OF CORRECTION

| | | |
|---|---|---|
| PATENT NO. | : 7,230,740 B2 | Page 1 of 1 |
| APPLICATION NO. | : 10/304319 | |
| DATED | : June 12, 2007 | |
| INVENTOR(S) | : Jason Quintana et al. | |

It is certified that error appears in the above-identified patent and that said Letters Patent is hereby corrected as shown below:

In column 12, line 67, in Claim 39, after "one of" insert -- : --.

Signed and Sealed this

Sixteenth Day of September, 2008

JON W. DUDAS
*Director of the United States Patent and Trademark Office*